(12) United States Patent
Maerten et al.

(10) Patent No.: US 11,796,690 B2
(45) Date of Patent: Oct. 24, 2023

(54) METHOD AND DEVICE FOR THE QUANTIFICATION OF RADIONUCLIDES IN LIQUID MEDIA

(71) Applicant: UMWELT-UND INGENIEURTECHNIK GMBH DRESDEN, Dresden (DE)

(72) Inventors: Gottfried Horst Maerten, Dresden (DE); Jens Schubert, Dresden (DE)

(73) Assignee: UMWELT- UND INGENIEURTECHNIK GMBH DRESDEN, Dresden (DE)

( * ) Notice: Subject to any disclaimer, the term of this patent is extended or adjusted under 35 U.S.C. 154(b) by 0 days.

(21) Appl. No.: 17/767,097

(22) PCT Filed: Oct. 8, 2020

(86) PCT No.: PCT/EP2020/078214
§ 371 (c)(1),
(2) Date: Apr. 7, 2022

(87) PCT Pub. No.: WO2021/069548
PCT Pub. Date: Apr. 15, 2021

(65) Prior Publication Data
US 2022/0365226 A1 Nov. 17, 2022

(30) Foreign Application Priority Data
Oct. 11, 2019 (EP) .................................. 19202751

(51) Int. Cl.
*G01T 1/167* (2006.01)
*G01T 1/20* (2006.01)
*G01T 1/36* (2006.01)

(52) U.S. Cl.
CPC ................ *G01T 1/167* (2013.01); *G01T 1/20* (2013.01); *G01T 1/36* (2013.01)

(58) Field of Classification Search
CPC .............. G01T 1/167; G01T 1/20; G01T 1/36
See application file for complete search history.

(56) References Cited

U.S. PATENT DOCUMENTS

2010/0121811 A1* 5/2010 Ramsden ................ G01T 1/167
250/361 R
2010/0219344 A1* 9/2010 Duckworth ............ G21C 19/46
250/362

(Continued)

FOREIGN PATENT DOCUMENTS

| CN | 106569250 A | 4/2017 |
| JP | S59141086 A | 8/1984 |
| JP | 2017161259 A | 9/2017 |

OTHER PUBLICATIONS

"IAEA-TECDOC-1363 Guidelines for radioelement mapping using gamma ray spectrometry data", Jul. 1, 2003, XP055682582, retrieved from the Internet: URL:https:www-pub.iaea.org/MTCD/Publications/PDFte_1363_web/PDF/Contents.df, Apr. 3, 2020.

(Continued)

*Primary Examiner* — Hugh Maupin
(74) *Attorney, Agent, or Firm* — PERRY + CURRIER, INC.

(57) ABSTRACT

The present invention relates to a method for the quantification of radionuclides in liquid media comprising measuring a gamma-ray spectrum, a device for the quantification of radionuclides in liquid media and the use for the quantification of radionuclide concentrations in hydrometallurgical processing media, especially the quantification of uranium and/or radioactive uranium decay product concentrations in uranium mining solutions or in uranium recovery solutions or the quantification of thorium and/or radioactive $^{232}$Th decay products in rare-earth element processing solutions.

19 Claims, 5 Drawing Sheets

(56) References Cited

U.S. PATENT DOCUMENTS

| | | | |
|---|---|---|---|
| 2010/0305873 A1* | 12/2010 | Sjoden | G01T 1/362 |
| | | | 702/30 |
| 2011/0012012 A1* | 1/2011 | Stein | G01T 1/17 |
| | | | 250/252.1 |
| 2011/0295537 A1* | 12/2011 | Akers | G01T 1/167 |
| | | | 250/252.1 |
| 2014/0197324 A1 | 7/2014 | Mendez et al. | |

OTHER PUBLICATIONS

Khorfan, A., et al., "A Quick Method to Determine Uranium Concentration by Gamma Spectroscopy: Its Application for Extraction of Uranium from Wet Phosphoric Acid", Journal of Radioanalytical and Nuclear Chemistry, vol. 257, No. 2 (2003) pp. 313-316.

Singh, Sarbjit, et al., "Development of a Technique for the on line Determination of Uranium in Solution by Gamma Ray Spectrometry", BHABHA Atomic Research Centre, Mumbai, India, 2005, BARC/2005/E/005.

Sundar, Uma, et al., "Rapid Measurements of Concentrations of Natural Uranium in Process Stream Samples via Gamma Spectrometry at an Extraction Facility", Talanta 73 (2007), pp. 476-482, www.sciencedirect.com.

Extended European Search Report dated May 12, 2020, issued in corresponding European Patent Application No. 19202751.4, Filed Oct. 11, 2019.

"International Search Report", dated Nov. 24, 2020, issued in corresponding PCT Application No. PCT/EP2020/078214, Filed Oct. 8, 2020.

* cited by examiner

METHOD AND DEVICE FOR THE QUANTIFICATION OF RADIONUCLIDES IN LIQUID MEDIA

The present invention relates to a method for the quantification of radionuclides in liquid media comprising measuring a gamma-ray spectrum, a device for the quantification of radionuclides in liquid media and the use for the quantification of radionuclide concentrations in hydrometallurgical processing media, especially the quantification of uranium and/or radioactive uranium decay product concentrations in uranium mining solutions or in uranium recovery solutions or the quantification of thorium and/or radioactive $^{232}$Th decay products in rare-earth element processing solutions.

Commonly, methods for the quantification of $^{235}$U in a system at very low to vanishing concentrations of $^{226}$Ra apply gamma-ray spectroscopy to measure the intensity of gamma-rays within the $^{235}$U-specific 185.7 keV peak range (Kaspar et al. 2017). Since $^{238}$U does not emit gamma rays, its amount in a sample is quantified by measuring the peak intensity of 1001.0 keV gamma rays emitted by the decay chain product $^{234m}$Pa under the condition that the first three members of the $^{238}$U decay chain $^{238}$U, $^{234}$Th and $^{234m}$Pa have reached secular equilibrium. Under the condition that samples contain natural uranium only, i.e. at (0.720±0.002)% abundance for $^{235}$U, the 185.7 keV gamma peak intensity is used to determine the amount of total uranium in a sample. Disadvantageously, $^{226}$Ra as a radioactive isotope of the $^{238}$U decay chain emits gamma rays with the main gamma line at 186.1 keV. This gamma line superposes the 185.7 keV gamma line from $^{235}$U in natural systems, for example in uranium ore, significantly. Thus, the quantification of the $^{235}$U concentration is no longer reliable.

However, systems with very low or vanishing concentration of $^{226}$Ra are obtained by highly selective leaching of uranium from natural uranium ore. Thus, the quantification of the 185.7 keV peak intensity can be used to determine the concentration of $^{235}$U and total U (Khorfan et al. 2003, Singh et al. 2005, Sundar et al. 2007).

Singh et al. describe a method for online measurement of uranium in solution by gamma-ray spectroscopy in a container with inlet and outlet using standard solutions of known concentrations (Singh et al. 2005).

CN 106569250 A discloses a device for the online measurement of uranium concentration in a leach slurry of uranium ore based on the NaI(Tl) measurement of the 185.7 keV gamma peak area of $^{235}$U. Disadvantages of the disclosed method is the interference of $^{226}$Ra and volume or matrix effects, respectively, based on calibrating the system by applying a $^{235}$U calibration source, a point-source that is not exactly representative for the voluminous slurry sample.

CN 105115993 A and CN 204989064 U describe a device for the online measurement of uranium concentration in solution based on a NaI(Tl) scintillator detecting the gamma rays from a rather small solution compartment. Advantageously, matrix effects are decreased. Disadvantages of the disclosed method is the limited efficiency.

CN 105181719 A discloses a method for the online measurement of uranium concentration in solution based on the NaI(Tl) measurement of the 185.7 keV gamma peak area of $^{235}$U. CN 105181719 A describes the calibration of the system by using 5 reference samples at given uranium concentrations in 5 M nitric acid solution. The application of this method is limited to the very specific chemical composition of the sample solution.

JP S59 141086 A discloses a method and device to measure low $^{235}$U concentrations in solutions that are typical in nuclear fuel processing applications (i.e. for the quantification $^{235}$U enrichment). The spectroscopic measurement is performed by using a gamma ray detector outside the solution cell (pipe) with reference to an external reference gamma ray source within a collimating system. The method is not applicable to any solutions containing several gamma-ray-emitting radionuclides (i.e. where spectral decomposition based on spectral templates would be required for reliable results). Solution matrix effects in the measuring cell are not considered in this general context.

US 2014/0197324 A1 refers to the spectroscopy of response γ-rays from lithological (or earth) formations or other sample objects (human or animal bodies, plant matter, inanimate objects) by using a gamma-ray tool that is applied adjacent to the sample object. The method includes the spectral decomposition of response gamma-ray spectra in the energy range from 100 keV to 10 MeV in order to quantify the concentration of at least one radionuclide (element) that emits gamma rays. The numerical analysis is performed with reference to a defined volume of a standard gamma-ray spectrum of a reference sample. US 2014/1197324 A2 does neither disclose the determination of radionuclide-specific spectral templates nor the correction for matrix effects explicitly.

JP 2017/161259 A refers to the application of gamma ray spectroscopy to determine the radionuclide concentrations (described for $^{134}$Cs, $^{137}$Cs, and $^{40}$K only) in contaminated soils (e.g. after nuclear accidents). The individual response functions are simulated by a Monte Carlo radiation transport software in order to identify the spectral contributions of individual radionuclides to the measured spectrum.

IAEA-TECDOC-1363 summarizes general guidelines for the application of gamma-ray spectroscopy for radioelement mapping (Nicolet and Erdi-Krausz 2003).

Alternatively, measuring principles to quantify the uranium concentrations in metallurgical processing media are based on the spectroscopy of characteristic electromagnetic radiation ranging from photometric, hyperspectral or Raman spectroscopic applications or X-ray fluorescence. Disadvantageously, these methods are not applicable or at least not reliable in industrial applications, mainly caused by significant radiation attenuation in the sample as well as in the measuring window.

The object of the present invention is to provide a method for the quantification of radionuclides in liquid media, which overcomes disadvantages of the state of the art.

The object has been solved by providing a method for the quantification of radionuclides in liquid media comprising the following steps a) Providing a liquid medium comprising at least one radionuclide in a measuring cell,
wherein a gamma ray detector is positioned in the measuring cell, b) Measuring a gamma ray pulse-height spectrum of the liquid medium with the gamma ray detector, c) Providing simulated gamma ray pulse-height spectra templates for radionuclides and calibration factors,
wherein the gamma ray pulse-height spectra templates are corrected for matrix effects, d) Computer-implemented identification and quantification of the at least one radionuclide in the liquid medium using a spectral fitting of the measured gamma ray pulse-height spectrum by a weighted combination of the simulated gamma ray pulse-height spectra templates for radionuclides and the calibration factors, wherein the spectral fitting corrects temperature effects and background effects.

As used herein, the term "gamma ray spectra template" refers to a spectral response distribution of gamma-ray detector signals for one gamma-ray source as a function of gamma-ray detector signal pulse-height given in gamma-ray energy equivalent, wherein the template is obtained by computer simulation. The gamma-ray source is a three-dimensional one according to the measuring cell geometry in the present application, wherein a gamma ray detector is positioned in the measuring cell.

As used herein, the term "calibration factor" refers to an individual factor for each radionuclide (radionuclide-specific), which correlates a concentration of the radionuclide in the liquid medium in the measuring cell with the intensity parameter (spectral weight) from the spectral fitting. Advantageously, a calibration factor is applied for quantifying a specific radionuclide concentration at given spectral weight from the decomposition applied.

As used herein, the term "simulation" refers to a modelling of radiation transport from a gamma-ray source, preferably the voluminous liquid medium comprising at least one radionuclide in the measuring cell, to the gamma-ray detector considering transport processes in the medium itself, in the measuring cell construction materials, in the detector and its housing.

Advantageously, the method according to the invention quantifies radionuclides in liquid media in real-time. As used herein, the term "real-time" refers to a quantification of radionuclide concentrations within a short time, preferably in the range of 10 s to 10 h, more preferably 1 min to 30 min, most preferably 1 min to 5 min. The time for quantification of the radionuclide concentration with the method according to the invention depends on the time of measuring a gamma ray spectrum of the liquid medium with the gamma ray detector according to step b), in particular the concentration of the radionuclide, its specific gamma-ray emission intensity and the gamma-ray detector response.

Further advantageously, the method according to the invention is self-compensated, in particular compensating for matrix effects, temperature effects and background effects. The term "self-compensated" refers to the compensation or correction, respectively, of the matrix effects, the temperature effects and the background effects within the method itself, in particular by providing simulated gamma ray spectra templates for radionuclides and the calibration factors, wherein the gamma ray spectra templates are corrected for matrix effects.

Matrix effects are, in particular, due to the scattering and absorption of gamma rays inside the measuring cell and construction materials. In embodiments, the gamma-ray pulse-height spectra templates are corrected for matrix effects by setting up the simulation according to the three-dimensional geometry and material characteristics of all components of the device.

Temperature effects that lead to a scaling of the measured gamma ray pulse-height spectrum are considered by a pulse-height scaling factor in the spectral fitting procedure. The method further includes the computer-implemented identification and quantification of the radionuclide using the simulated gamma ray spectra templates for radionuclides and calibration factors, wherein the measured gamma ray spectrum is corrected for background effects.

Further advantageously, using the method according to the invention for real-time quantification, an automated process control can be applied, in particular to react on changes of process parameters, including radionuclide or element concentrations, within typical time constants of processing kinetics.

In embodiments, the at least one radionuclide is selected from the group of most common natural gamma-ray emitting radionuclides, preferably from the group comprising $^{235}U$, $^{234m}Pa$, $^{234}Th$, $^{226}Ra$, $^{214}Pb$, $^{214}Bi$, $^{228}Ac$, $^{212}Pb$, $^{208}Tl$, $^{40}K$ and artificial radionuclides. Advantageously, all gamma-ray emitting radionuclides listed above are considered in the data processing according to step c) and step d) usually. The data interpretation incorporates the half-lives of all radionuclides within the radioactive decay chains.

Preferably, at least one radionuclide is $^{235}U$, at least one radionuclide from the $^{238}U$ decay chain, in particular $^{234m}Pa$, $^{234}Th$, $^{226}Ra$, $^{214}Pb$, $^{214}Bi$; at least one radionuclide from the $^{232}Th$ decay chain, in particular $^{228}Ac$, $^{212}Pb$, $^{208}Tl$; $^{40}K$, and/or any artificial radionuclide.

As used herein, the term "radioactive decay product" refers to a radionuclide arising from a radioactive decay chain, preferably from $^{235}U$, $^{238}U$, or $^{232}Th$.

Advantageously, the method according to the invention enables the quantification of artificial radionuclides. In embodiments, artificial radionuclides are fission products as part of nuclear reactor waste or from nuclear weapon tests, preferably $^{137}Cs$ and $^{137m}Ba$; or isotopes used for medical or technical applications, preferably $^{60}Co$.

Advantageously, the method according to the invention is applicable for liquid media comprising more than one radionuclide, in particular complex mixtures of radionuclides, in particular for conditions of disequilibrium of radionuclides and their decay products.

In further embodiments, the liquid medium comprising at least one radionuclide according to step a) is selected from hydrometallurgical process media, preferably leach slurries, leach solutions, concentrated processing solutions and waste solutions. Preferably, the liquid medium comprising at least one radionuclide is selected from uranium mining solutions or in uranium recovery solutions or rare-earth element processing solutions. Advantageously, the method according to the invention can be used for the quantification of rare-earth element processing solutions, wherein rare-earth ores are associated with Th primarily and U together with all radioactive decay products of the relevant decay chains for Th and U.

Advantageously, leaching of uranium ores, e. g. in leach slurries or leach solutions, results in selective dissolution of uranium while decay products of uranium, in particular $^{226}Ra$, are not dissolved or are immobilized by secondary precipitation. Thus, the $^{235}U$ spectrum with the specific 185.7 keV gamma line is not superposed by the $^{226}Ra$ spectrum with the specific 186.1 keV gamma line and the $^{235}U$ and consequently, the uranium concentration can be quantified precisely. In some embodiments, the spectral fitting corrects for the remaining interference by gamma rays from residual $^{226}Ra$. Advantageously, significant $^{226}Ra$ interference can be corrected with the method according to the invention.

In embodiments, the liquid medium comprising at least one radionuclide according to step a) is provided with a continuous flow. Advantageously, a continuous flow enables the measurement in real-time, in particular the measurement of any changes of the radionuclide composition and concentration.

In embodiments, the liquid medium is provided with a plug-like flow. As used herein, the term "plug-like flow" refers to a velocity profile of a liquid medium, wherein the velocity of the fluid is nearly constant across any crosssection of the measuring cell perpendicular to the axis of the measuring cell. Advantageously, the plug-like flow is uniform and minimizes the time of the exchange of the liquid medium in the measuring cell. A very low exchange time is required to minimize the off time of the measuring device during the transition from processing media and pure water for background measurement or during the transition between different inflow lines (multiplexer mode).

In embodiments, the liquid medium is provided with a flow rate in the range of 3 l/min to 6 l/min. Advantageously, this flow rate enables an exchange of the liquid medium in the measuring cell in a short time, preferably in the range of 0.1 min to 2 min, more preferably in the range of 1 min to 2 min.

According to the invention, the measuring cell is designed for liquid media and comprises the liquid medium comprising at least one radionuclide and the gamma ray detector.

In further embodiments, the measuring cell is a flow-through measuring cell. Alternatively, the measuring cell is a processing unit, preferably a pipe or preferably agitated tank.

In embodiments, the measuring cell is cylindrical.

Preferably, the gamma-ray detector is positioned in the center of the measuring cell. As used herein, the term "center" is the point equally distant from the outer limits, preferably of a cylindrical measuring cell.

In embodiments, the gamma-ray detector is surrounded by a watertight containment, preferably a double walled cylindrical container.

In further embodiments, the distance from the outer limits of the measuring cell to the gamma-ray detector wall is in the range of 2 cm to 20 cm, preferably in the range of 5 cm to 10 cm. Advantageously, the gamma-ray detector in the center of a measuring cell with a distance from the outer limits of the measuring cell to the gamma-ray detector wall in the given range enables the measurement of gamma rays from a large sample volume, preferably an effectively infinite sample volume, which means that an increase of the sample volume would not result in an increase of the gamma-ray detector response. Advantageously, a large sample volume results in an increase of the count rate and a decrease of the statistical uncertainty of the measurement. Thus, the measurement time is decreased and a real-time measurement is possible. Advantageously, the geometry of the measuring cell can be optimized with regard to the main target radionuclides emitting specific gamma rays with corresponding ranges in the liquid medium itself.

In embodiments, a liquid medium comprising at least one radionuclide according to step a) is provided by leaching and/or processing of a material or a solution comprising at least one radionuclide.

In a further embodiment, the leaching and/or processing of a material or a solution comprising at least one radionuclide according to step a) and measuring the gamma-ray spectrum of the liquid medium according to step b) are done in-line or in-situ. Advantageously, the in-line or in-situ measurement enables a real-time measurement.

As used herein, the term "in-line" refers to measurement of radionuclide-containing medium in a processing line, whereas the measuring cell is part of or connected to the processing line or processing unit itself. Advantageously, the in-line measurement enables a swiftly process control.

As used herein, the term "in-situ" refers to the measurement of radionuclide concentrations in the processing medium directly, i.e. without taking samples to be measured off-site in an analytical laboratory.

Preferably the method according to the invention is carried out in the order of the steps a), b), c) and d) or c), a), b) and d) or c).

In embodiments, the measurement time of the gamma spectrum according to step b) is in the range of 10 s to 10 h, preferably in the range of 1 min to 30 min.

According to the invention, simulated gamma-ray spectra templates for radionuclides and calibration factors are provided, wherein the gamma-ray spectra templates are corrected for matrix effects by the simulation set up for the measuring geometry, i. e. the position of the gamma ray detector in the measuring cell and the geometry of the measuring cell itself.

The simulated gamma-ray spectra templates for radionuclides and calibration factors are the basis for a spectral decomposition by applying a spectral fitting.

As used herein, the term "matrix effects" refers to changes in the gamma-ray spectrum due to adsorption and scattering of gamma rays in the liquid medium, e. g. the 185.7 keV gamma ray of $^{235}U$ is absorbed to 50% in the thickness of 4.0 cm of water. Advantageously, the method according to the invention corrects matrix effects, in particular strong matrix effects in a large sample volume.

As used herein, the term "temperature effects" refers to changes in energy scale and resolution shifts and thus, the pulse height for an electron in the pulse-height spectrum, resulting from the interaction of a gamma ray within the scintillator due to changes of the temperature. Advantageously, using spectral fitting in step d) also corrects temperature effects, in particular energy scale and resolution shifts.

Preferably, the temperature effects are corrected by a pulse-height scaling factor applied to the spectral fitting procedure according to step d).

In further embodiments, the simulated gamma-ray spectra templates for radionuclides and calibration factors in step c) are obtained by simulation with a statistical radiation transport software for complex systems, preferably with a Monte Carlo N-Particle (MCNP) code as provided by Los Alamos National Laboratory (LANL) or GEANT4. Preferably, the software MCNP6.2 is used (https://mcnp.lanl.gov/). Advantageously, the statistical radiation transport software for complex systems takes account of the measuring geometry and the material of the measuring cell, including gamma-ray detector, liquid medium, compartment and all walls, shielding elements and if present other components. Thus, determining the calibration factors for individual radionuclides by relating the concentration of an individual radionuclide to its absolute response function measured by the gamma-ray detector, is preferably validated and adjusted against analytical data for representative samples.

In embodiments, the simulated gamma-ray spectra templates for radionuclides and calibration factors in step c) are provided for the most common natural gamma-ray emitting radionuclides, preferably for the radionuclides $^{235}U$, $^{234m}Pa$, $^{234}Th$, $^{226}Ra$, $^{214}Pb$, $^{214}Bi$, $^{228}Ac$, $^{212}Pb$, $^{208}Tl$ and/or $^{40}K$. Advantageously, all natural gamma-ray emitting radionuclides listed above are considered in the data processing according to step c) and step d) usually.

Preferably, the computer simulated gamma-ray spectra templates for radionuclides and calibration factors are validated against chemical analysis of radionuclide samples, preferably with inductively coupled plasma mass spectrometry (ICP-MS) or precision titration methods.

According to the invention, the at least one radionuclide in the liquid medium is identified and its concentration in the liquid medium is quantified using a spectral fitting algorithm of the measured gamma ray pulse-height spectrum by a weighted combination of the simulated gamma ray pulse-height spectra templates for radionuclides and the calibration factors, wherein the spectral fitting corrects temperature effects.

As used herein, the term "spectral fitting" refers to a procedure using a model-function which is a weighted sum of radionuclide-specific pulse-height templates. Advantageously, using the spectral fitting the spectral weight of all relevant individual radionuclides in the liquid medium can be translated to the individual radionuclide concentration on the basis of the calibration factor for each radionuclide. Each radionuclide-specific pulse-height template is obtained by transformation of gamma-ray energy-spectra (i.e. gamma ray spectra templates) to pulse-height spectra. The fitting procedure varies the weights of the summands of the model-function (also called weight-factors) and it also varies parameters for energy scale and energy resolution. The spectral fitting procedure further comprises the transformation of weight-factors to concentrations with the calibration factors. The spectral fitting procedure corrects for the gamma-ray background.

In embodiments, the spectral fitting is a least chi square fit, a likelihood fit or similar, preferably a least chi square fit.

In embodiments, the correction of background effects is done by measuring a background spectrum with clean water, preferably in the range of every hour to every week, more preferably once a day. Advantageously, measuring the background spectrum enables the identification of long-term changes, in particular an increase scaling or fouling effects or adsorption, i.e. the accumulation of radionuclide-bearing substances at the surface of the gamma-ray detector or the inner surface of the measuring cell. If the scaling or fouling effects exceed a tolerable limit, the measuring cell has to be cleaned. The tolerable limit is defined by the user in dependence on the specific application.

In embodiments, a control system monitors the background effects and/or signals exceeding the tolerable limit.

In further embodiments, the method according to the invention, wherein the at least one radionuclide is uranium, comprises a further step, wherein the interference of $^{226}Ra$ on the measurement of $^{235}U$ and/or U concentrations is corrected. The correction of the interference of $^{226}Ra$ is achieved by quantification the dominant gamma-ray emitting radionuclides of the $^{238}U$ decay-chain, in particular $^{214}Bi$, $^{214}Pb$, and $^{226}Ra$, and by constraining their weighting factors in the gamma-ray fitting to a fixed ratio, i.e. the ratio corresponding to secular equilibrium between $^{214}Bi$, $^{214}Pb$, and $^{226}Ra$.

In further embodiments, the method according to the invention, wherein the at least one radionuclide is uranium, comprises a further step, wherein the total U concentration is calculated from the $^{235}U$ concentration with the fixed $^{235}U$ isotope abundance of $(0.720\pm0.002)\%$.

In embodiments, the gamma-ray spectra are stored, preferably every 10 s to every 1 min. Advantageously, the gamma-ray spectra to be analysed by the spectral fitting are deduced from the stored gamma-ray spectra as sliding average in a way to realize appropriate statistical uncertainties.

Another aspect of the invention is a device for the quantification of radionuclides in liquid media according to the method according to the invention.

Preferably, the device according to the invention comprises a data processing unit adapted to execute step d) of the method according to the invention.

Another object of the invention is a device for the quantification of radionuclides in liquid media comprising
 i. at least one measuring cell,
 ii. a gamma-ray detector comprising at least one amplifier and at least one multichannel analyzer,
  wherein the gamma-ray detector is positioned in the measuring cell,
 iii. a data processing unit comprising a processor configured to provide simulated gamma-ray pulse-height spectra templates for radionuclides and calibration factors,
  wherein the gamma-ray pulse-height spectra templates are corrected for matrix effects,
  and perform an identification and quantification of at least one radionuclide using a spectral fitting of a measured gamma-ray pulse-height spectrum by a weighted combination of the simulated gamma-ray pulse-height spectra templates for radionuclides and the calibration factors,
  wherein the spectral fitting corrects temperature effects and background effects.

According to the invention, the measuring cell is designed for liquid media and comprises the liquid medium comprising at least one radionuclide and the gamma ray detector.

Preferably, the measuring cell is designed for achieving a high detection efficiency, in particular to measure the radionuclide concentration with sufficient accuracy in a short period of time, by an optimized geometry, in particular a large sample volume for maximizing counting statistics for gamma-ray spectroscopy; and by optimized throughput conditions, in particular plug-flow for achieving small volume exchange times.

In embodiments, the at least one measuring cell is flow-through measuring cell. Alternatively, the measuring cell is a processing unit, preferably a pipe or a tank, more preferably an agitated tank with at least one inlet and outlet.

In embodiments, the measuring cell is cylindrical. Preferably, the gamma-ray detector is positioned in the center of the measuring cell.

In further embodiments, the measuring cell has a volume in the range of 1 l to 30 l, preferably in the range of 3 l to 10 l.

In embodiments, the at least one measuring cell is shielded against external background gamma-ray sources. Preferably the at least one measuring cell is lead (Pb) shielded.

In further embodiments, the Pb shielding has a thickness of at least 10 mm, preferably in the range of 10 mm to 50 mm. In further embodiments, the Pb shielding is selected from lead mats, lead rings and lead plates. Advantageously, the Pb shielding shields the measurements, in particular the gamma-ray detector, against external background gamma-ray sources. Thus, the detection limit of the quantification is decreased. Thus, higher Pb shielding thickness is preferred to minimize the background radiation.

In embodiments, the gamma-ray detector is a gamma scintillator, preferably a cerium or lanthanum halide or a NaI(Tl) scintillator. Advantageously the gamma-ray detectors are high-performance and/or large-volume gamma-ray detectors with a high detection efficiency and a good resolution. Further advantageously, the high detection efficiency combined with a large sample volume minimizes the statistical uncertainty and the measurement time.

Preferably, the gamma scintillator is selected from the group comprising $CeBr_3$, $LaBr_3$:Ce, $LaCl_3$:Ce and NaI(Tl) scintillator, more preferably the gamma scintillator is a $CeBr_3$ scintillator.

In further embodiments, the gamma-ray detector is a large size detector. Advantageously, a large size detector increases the effective spectral count rate and thus, decreases the measurement time.

In embodiments, the gamma-ray detector is surrounded by a watertight containment, preferably a double walled cylindrical container. Advantageously, the watertight containment completely isolates the gamma-ray detector from the sample volume.

In embodiments, the watertight containment and/or an inner lining of the measuring cell is made of plastics. Advantageously, plastics adsorb a minimum of gamma rays. Further advantageously, plastics withstand liquid media with high salt concentrations and/or low pH values, preferably down to pH 0.5. Preferably, the watertight containment and/or an inner lining of the measuring cell is not made of polyvinyl chloride (PVC). Disadvantageously, thorium is adsorbed by PVC and thus, would contribute to the background and influence the detection limit.

In embodiments, the device according to the invention further comprises at least one processing unit, preferably a tank or pipe. In a further embodiment, the processing unit is connected to the measuring cell directly by an inlet or by a by-pass or branch-off flow-through measuring cell.

In embodiments, the device according to the invention further comprises at least one further element selected from the group comprising a rate meter, a peak stabilizer, a cooler, in particular an electric cooling or nitrogen ($N_2$) cooling, and a multiplexer, preferably a hydraulic multiplexer.

Advantageously, a multiplexer enables the measurement of radionuclide concentrations in at least two processing units, preferably 2 to 20 processing units, more preferably 6 to 12 processing units, in a sequential manner. In an embodiment, the multiplexer is setup by a control unit.

In preferred embodiments, the device according to the invention comprising a multiplexer includes one inlet from a pure-water reservoir. Advantageously, the pure-water reservoir is used to measure the background of the gamma-ray spectrum. Further advantageously, the device with a multiplexer comprising one inlet from a pure-water reservoir enables flushing of the device and measurement of background spectrum in an optimum time.

Advantageously, measuring the background spectrum enables the identification of increased scaling or fouling effects, i.e. the accumulation of radionuclide-bearing substances at the surface of the gamma-ray detector or the inner surface of the measuring cell.

Another aspect of the invention is the use of the method according to the invention and/or the device according to the invention for the quantification of radionuclide concentrations in hydrometallurgical processing media, preferably the quantification of uranium and/or radioactive uranium decay product concentrations in uranium mining solutions or in uranium recovery solutions or the quantification of thorium and/or radioactive $^{232}$Th decay products in rare-earth element processing solutions. In addition, the radionuclide concentrations measured with the method and/or device according to the invention can be used to realize a real-time process control, i.e. to adjust processing conditions to achieve target values of radionuclide concentrations.

In some embodiments, the method according to the invention and/or the device according to the invention are used for assessing the efficiency of the removal of thorium and/or radioactive $^{232}$Th decay products from the rare-earth elements by:

(a) Due to the low half-life of $^{228}$Ac (6.13 h), the gamma-ray intensity of $^{228}$Ac is used to quantify the removal of the element Ra, in particular $^{228}$Ra as the mother nuclide of $^{228}$Ac, (b) Due to the low half-lives of all decay products resulting from the decay of $^{228}$Th, the intensity of the gamma emission from $^{212}$Pb and $^{208}$Tl is used to quantify the concentration of the element Th and the efficiency of its removal from the rare-earth elements.

In further embodiments, the recently described embodiments can be combined, in particular the embodiments of the method according to the invention can be applied to the device and the use according to the invention and the embodiments of the device according to the invention can be applied to the method and the use according to the invention.

The present invention will now be further explained by the following non limiting figures and examples.

Figure 3:
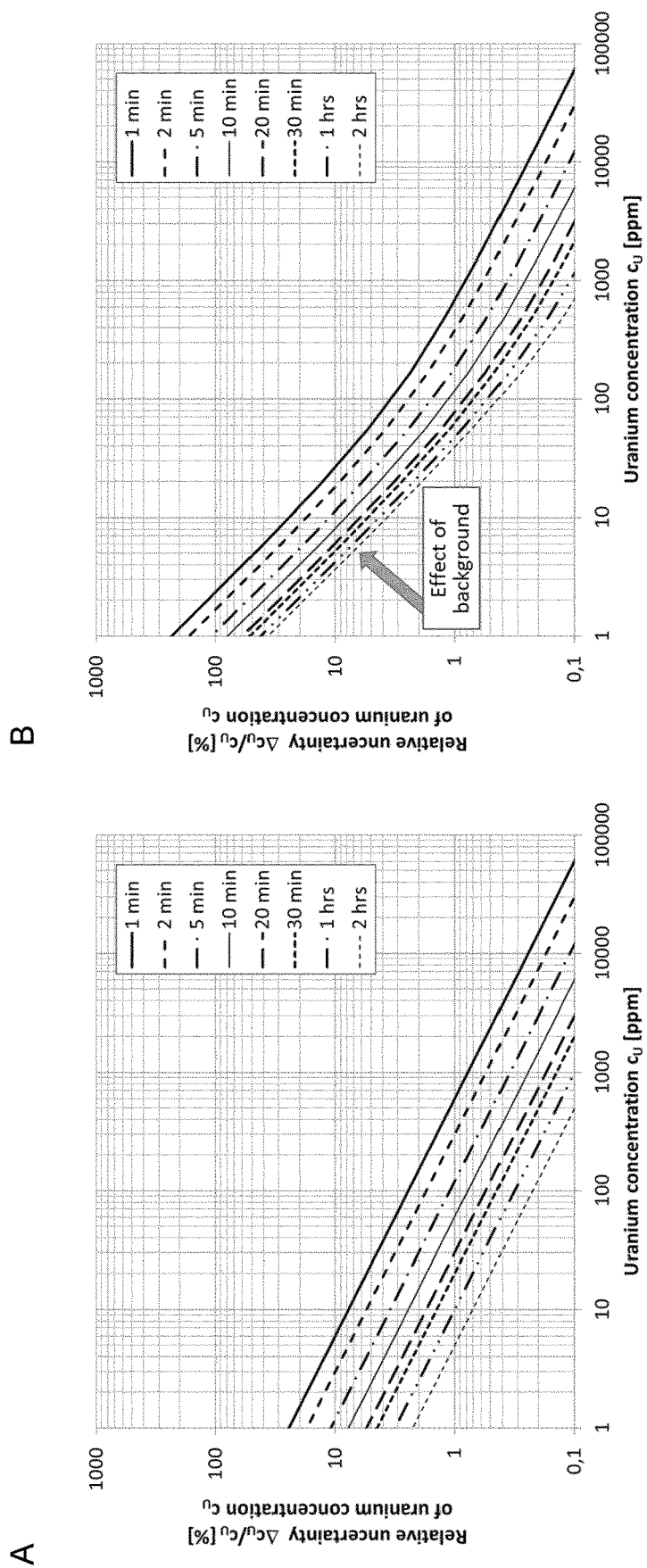

FIG. 3 shows the effect of the uranium concentrations in the liquid medium and the measurement time on the relative statistical uncertainty of the measurement of uranium concentrations in the case of vanishing to low Ra concentrations. A Relative statistical uncertainty as function of uranium concentration for zero background conditions (idealized case). B Relative statistical uncertainty as function of uranium concentration for typical background conditions in a 1 cm-thick shielding compartment.

Figure 4:
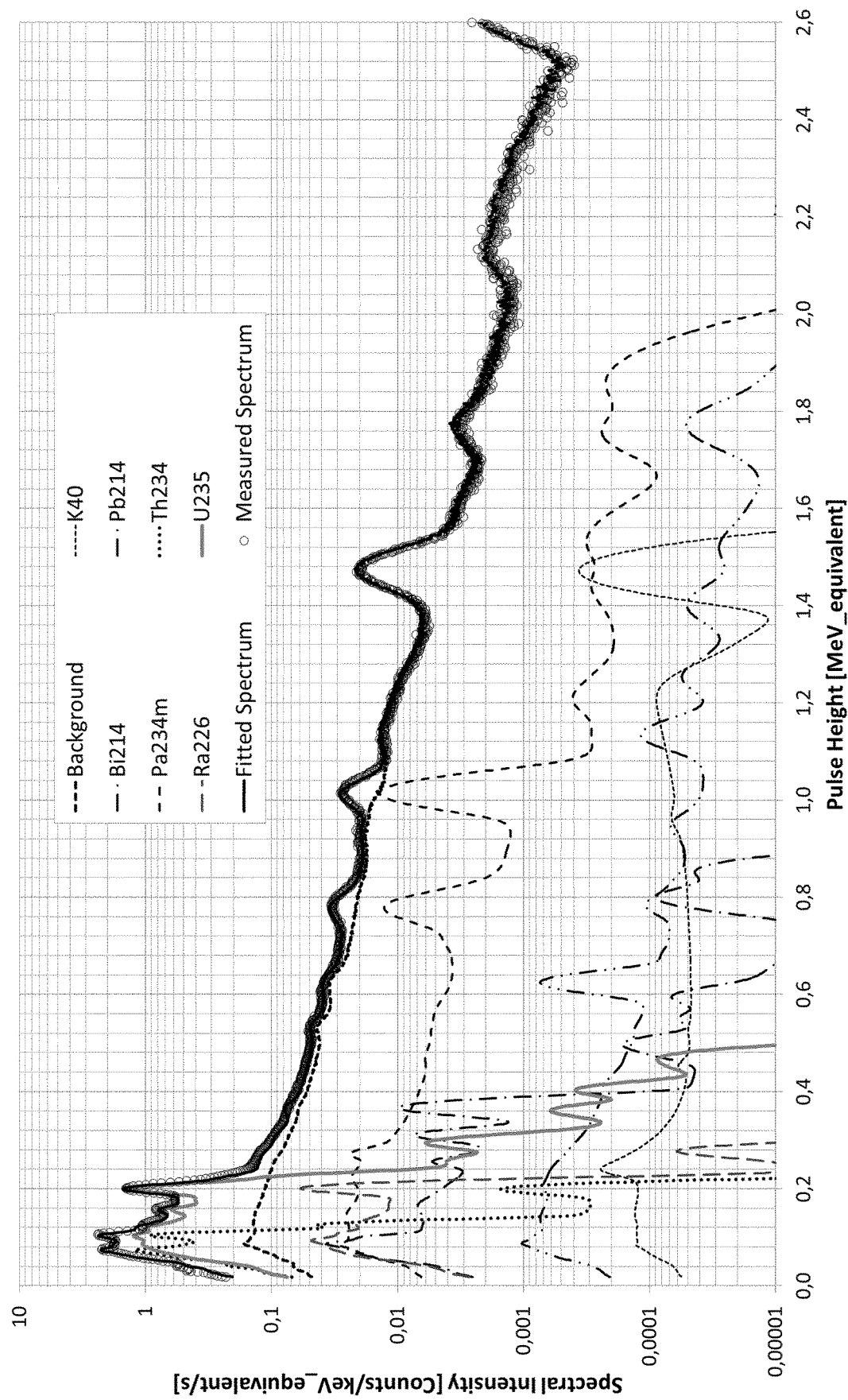

FIG. 4 shows a measured spectrum (logarithmic scale) of a uranium-bearing liquid medium containing 515 mg/l uranium with strongly suppressed concentrations of uranium decay products (achieved by selective leaching) in comparison with a fitted spectrum deduced by a mathematical fit procedure for decomposition based template spectra for radionuclides $^{40}$K, $^{214}$Bi, $^{241}$Pb, $^{234m}$Pa, $^{234}$Th, $^{226}$Ra and $^{235}$U (computer-simulated) and background (measured).

Figure 5:
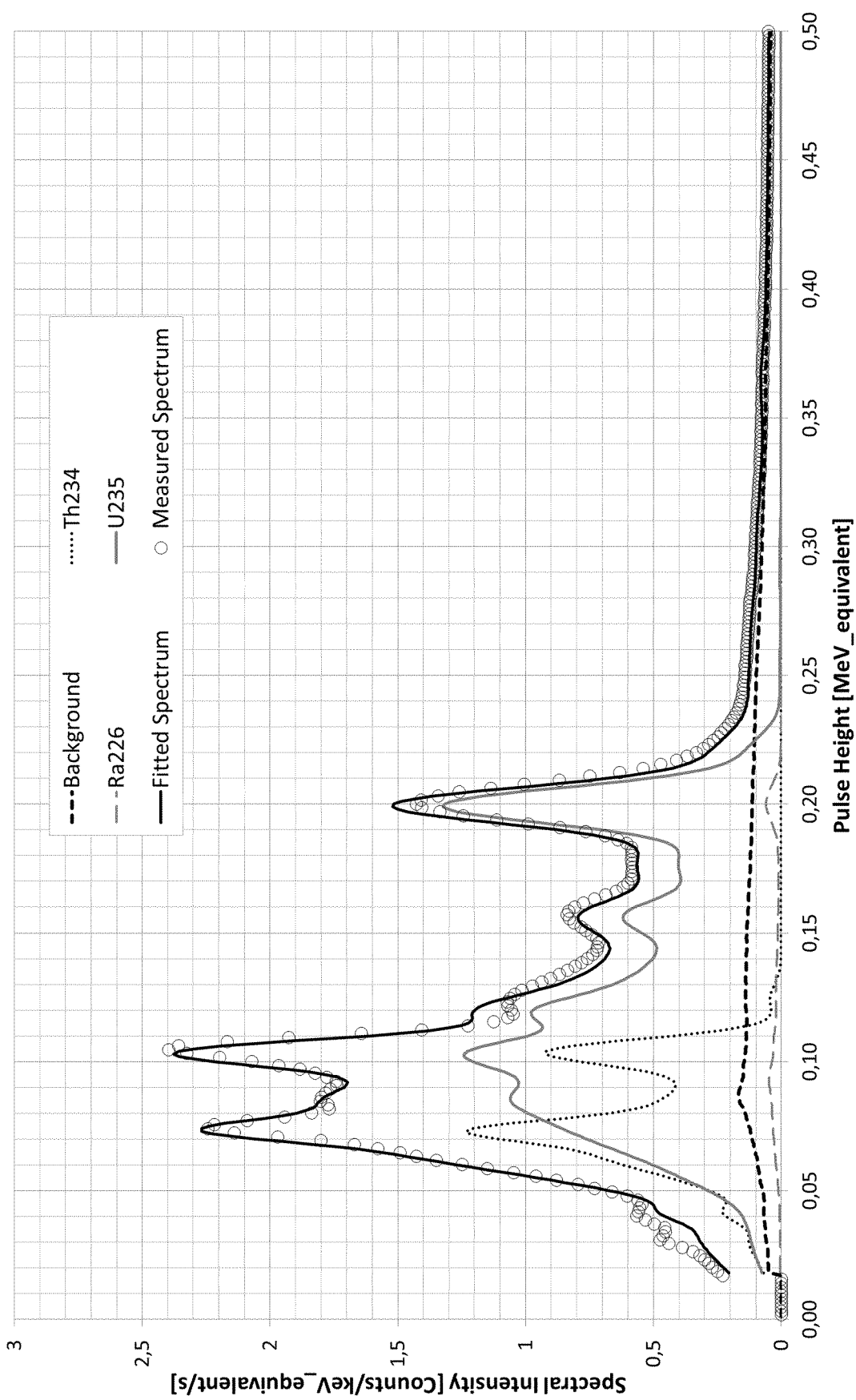

FIG. 5 shows a measured spectrum (linear scale) of a uranium-bearing liquid medium containing 515 mg/l uranium with strongly suppressed concentrations of uranium decay products (achieved by selective leaching) reduced to the energy range of interest for the current application in comparison with a fitted spectrum deduced by a mathematical fit procedure for decomposition based template spectra for the significant radionuclides $^{234}$Th, $^{226}$Ra and $^{235}$U (computer-simulated) and background (measured).

Figure 1:
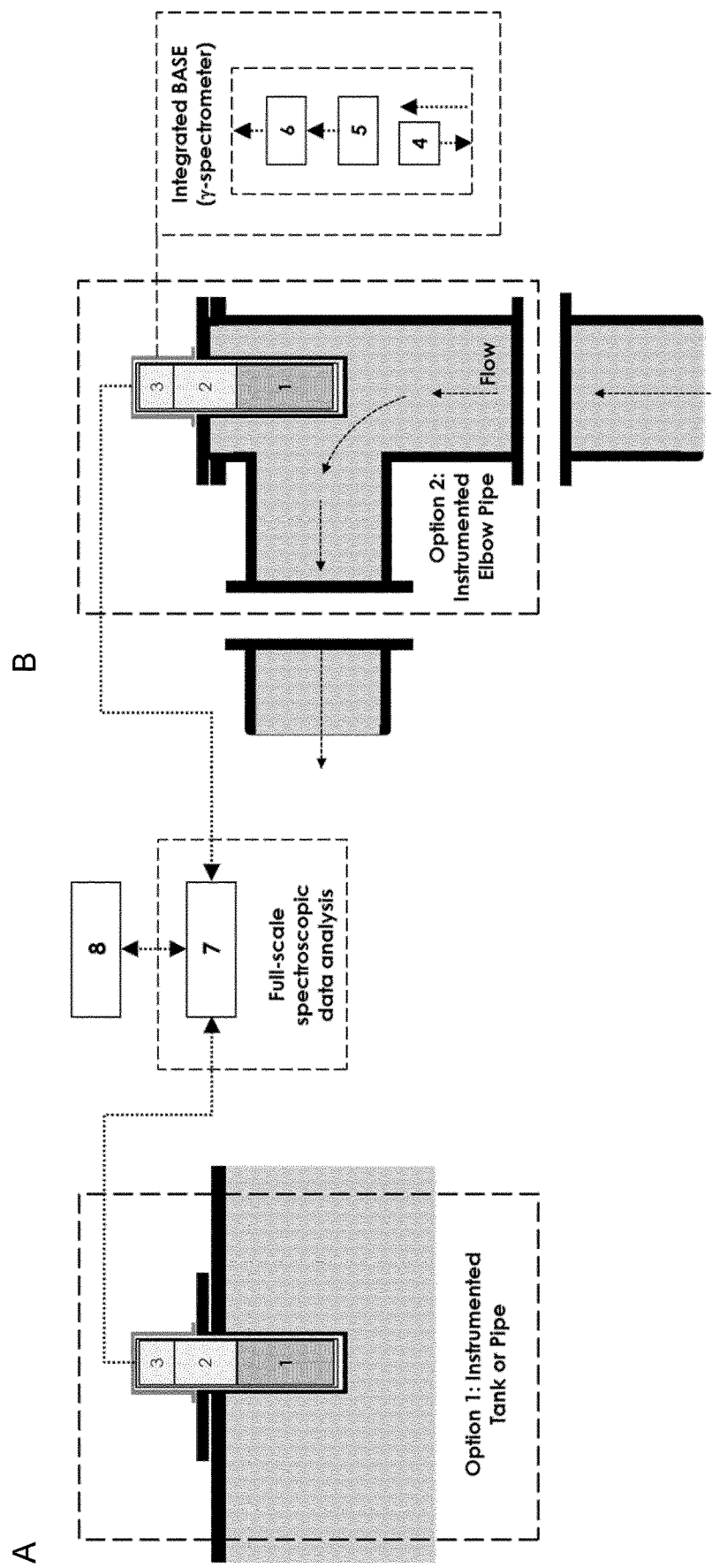
FIG. 1 shows a scheme of the device according to the invention with two embodiments. A) the gamma-ray detector is installed at the wall of a processing unit or measuring cell, respectively, B) the gamma-ray detector is installed in an elbow pipe as measuring cell.
Figure 2:
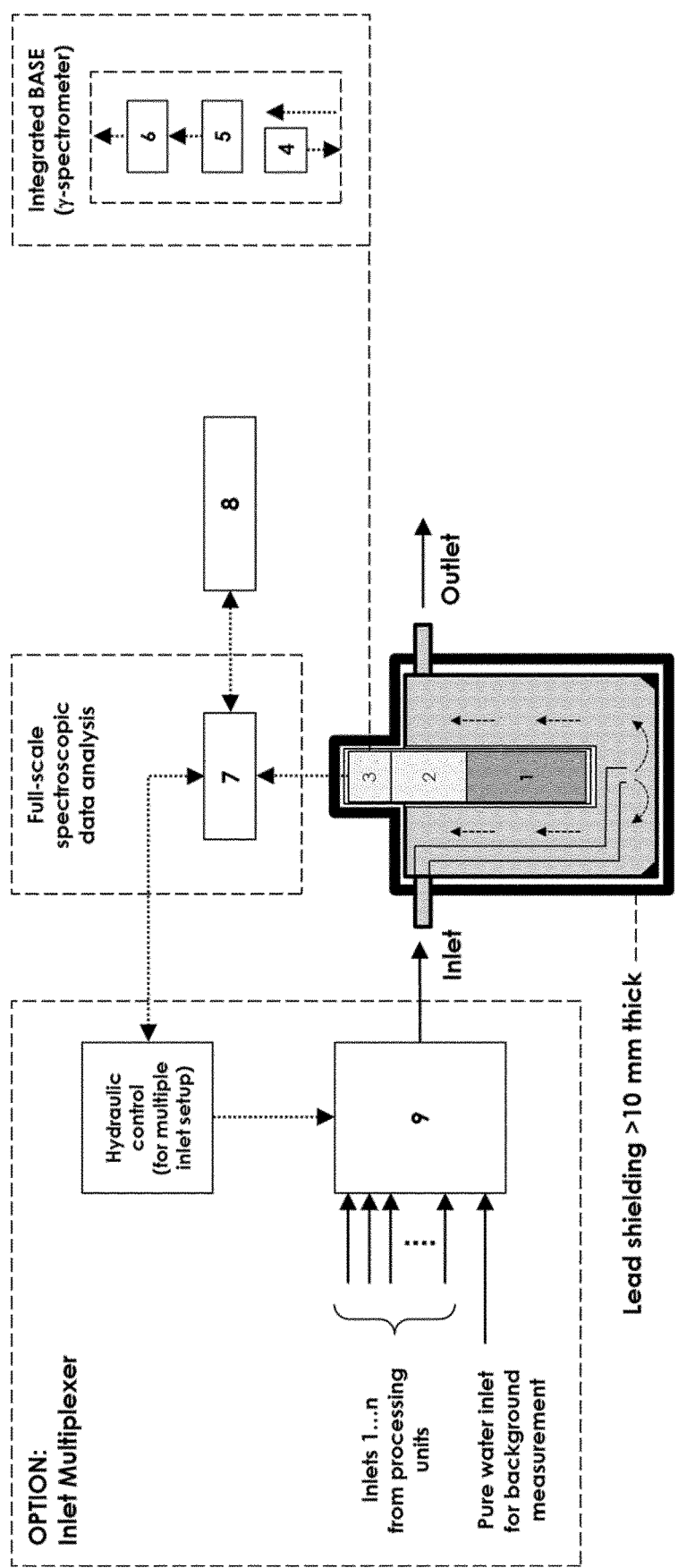
FIG. 2 shows a scheme of a flow-through measuring cell (by-pass or branch-off) including the gamma-ray detector and a large-volume compartment for the liquid media.

Examples of the device according to the invention are shown in FIG. 1A, B and FIG. 2. In the first example, the measuring cell comprises a gamma-ray detector, wherein the gamma-ray detector is installed at the wall of the measuring cell (FIG. 1A). In the second example the flow-through measuring cell is an elbow pipe, wherein the gamma-ray detector is installed (FIG. 1B). In both examples, the gamma-ray detector comprises a scintillator, a photomultiplier tube and an integrated base 3 of the gamma spectrometer comprising a high-voltage power supply 4, a pre-amplifier 5 and a multi-channel analyzer 6. Furthermore, the device according to the invention comprises a computer 7 and programmable logic controller 8 for the full scale spectroscopic data analysis and on-line access to the data measured by the device according to the invention.

A further example includes an inlet multiplexer 9 (FIG. 2). The flow-through measuring cell is a large-volume compartment (200 mm inner diameter, 260 mm inner height) for the liquid medium with one central inlet (to distribute the inflow uniformly) and one outlet (designed in form of a 4-outlet system to realize a throughput close to plug-flow conditions) and with a Pb shielding of 10 mm thickness and comprises a gamma-ray detector, wherein the gamma-ray detector is installed at the wall of the measuring cell. In an alternative example gamma-ray detector is installed in the center of the measuring cell. The gamma-ray detector comprises a scintillator 1, a photomultiplier tube 2 and an integrated base of the γ-spectrometer 3 comprising a high-voltage power supply 4, a pre-amplifier 5 and a multi-channel analyzer 6. Furthermore, the device according to the invention comprises a computer 7 and programmable logic controller 8 for the full scale spectroscopic data analysis and on-line access to the data measured by the device according to the invention. The computer is connected to a hydraulic control for the multiple setup of the inlet multiplexer 9 in order to unambiguously allocate the measured data to the origin (e.g. pipe) of the liquid medium.

Quantification of Uranium

A uranium-bearing liquid medium (sulfuric-acid leach solution) containing 515 mg/l uranium with strongly suppressed concentrations of uranium decay products (achieved by selective leaching of uranium) was measured with the device according to FIG. 2 and compared with a fitted spectrum deduced by a mathematical chi-square fit procedure for decomposition based on template spectra for the radionuclides $^{40}$K, $^{214}$Bi, $^{241}$Pb, $^{234m}$Pa, $^{234}$Th, $^{226}$Ra and $^{235}$U (computer-simulated with Monte Carlo N-Particle code as provided by Los Alamos National Laboratory) and background (measured with water). FIG. 4 and FIG. 5 represent the measured spectrum (in logarithmic and linear scale, respectively) in comparison with the fitted spectrum as well as all template spectra considered.

The effect of the background spectrum and measurement time on the relative statistical uncertainty of radionuclide concentrations and the lower level of detection is shown in FIG. 3 as function of uranium concentration in a leachate solution as an example, wherein the $^{226}$Ra concentration is vanishing. By increasing the thickness of the lead shielding from 10 mm to higher values the idealized case at minimum statistical uncertainty and lower level of detection show in FIG. 3a can be approached, wherein actual conditions dependent on local background level and thickness of lead shielding. FIG. 3b shows the uncertainty conditions for a moderate 10 mm lead shielding.

CITED NON-PATENT LITERATURE

Kaspar T C, Lavender C A, Dibert M W (2017) Evaluation of Uranium-235 Measurement Techniques. Prepared for the U.S. Department of Energy under Contract DE-AC05-76RL01830.

Khorfan A, Wahoud A, Rafool W (2003) A quick method to determine uranium concentration by gamma spectroscopy: Its application for extraction of uranium from wet phosphoric acid Journal of Radioanalytical and Nuclear Chemistry. 257 (2) 313-316.

Nicolet J-P, Erdi-Krausz G (2003) IAEA-TECDOC-1363 Guidelines for radioelement mapping using gamma ray spectrometry data, Retrieved from the internet: URL: https://www-pub.iaea.org/MTCD/Publications/PDF/te_1363_web/PDF/Contents.pdf.

Singh S, Ramaswami A, Singh Gill J (2005) Development of a technique for the on line determination of uranium in solution by gamma ray spectrometry. BARC Report. BARC/2005/E/005.

Sundar U, Ramamurthy V, Buche V, Rao D N, Sivadasan P C, Yadav R B (2007) Rapid measurements of concentrations of natural uranium in process stream samples via gamma spectrometry at an extraction facility. Talanta. 73 (3) 476-482.

REFERENCE SIGNS

1 Scintillator
2 Photo-multiplier tube
3 Base of γ-spectrometer
4 High-voltage power supply
5 Pre-amplifier
6 Multi-channel analyzer
7 Computer
8 Programmable logic controller
9 Multiplexer

The invention claimed is:

1. A method for the quantification of radionuclides in liquid media comprising the following steps
   a) Providing a liquid medium comprising at least one radionuclide in a measuring cell,
       wherein a gamma-ray detector is positioned in the measuring cell,
       wherein the gamma-ray detector is surrounded by a watertight containment,
   b) Measuring a gamma-ray pulse-height spectrum of the liquid medium with the gamma-ray detector,
   c) Providing simulated gamma-ray pulse-height spectra templates for radionuclides and calibration factors,
       wherein the gamma-ray pulse-height spectra templates are corrected for matrix effects,
   d) Computer-implemented identification and quantification of the at least one radionuclide in the liquid medium using a spectral fitting of the measured gamma-ray pulse-height spectrum by a weighted combination of the simulated gamma-ray pulse-height spectra templates for radionuclides and the calibration factors, wherein the spectral fitting corrects temperature effects and background effects.

2. The method according to claim 1, wherein the at least one radionuclide is selected from the group comprising $^{235}$U, $^{234m}$Pa, $^{234}$Th, $^{226}$Ra, $^{214}$Pb, $^{214}$Bi, $^{228}$Ac, $^{212}$Pb, $^{208}$Tl, $^{40}$K and artificial radionuclides.

3. The method according to claim 1, wherein the measuring cell is a flow-through measuring cell or a tank.

4. The method according to claim 1, wherein the distance from the outer limits of the measuring cell to the gamma-ray detector is in the range of 2 cm to 20 cm.

5. The method according to claim 1, wherein providing a liquid medium comprising at least one radionuclide according to step a) and measuring the gamma-ray spectrum of the liquid medium according to step b) are done inline or in-situ.

6. The method according to claim 1, wherein the simulated gamma-ray spectra templates for radionuclides and calibration factors in step c) are obtained by simulation with a statistical radiation transport software for complex systems.

7. The method according to claim 1, wherein the simulated gamma-ray spectra templates for radionuclides and calibration factors in step c) are provided for the radionuclides $^{235}$U, $^{234m}$Pa, $^{234}$Th, $^{226}$Ra, $^{214}$Pb, $^{214}$Bi, $^{228}$Ac, $^{212}$Pb, $^{208}$Tl and/or $^{40}$K.

8. The method according to claim 1, wherein correction of background effects is done by measuring a background spectrum with clean water.

9. The method according to claim 1, wherein the spectral fitting is a least chi square fit or a likelihood fit or similar.

10. A device for the quantification of radionuclides in liquid media comprising
   i. at least one measuring cell,
   ii. a gamma-ray detector comprising at least one amplifier and at least one multichannel analyzer,
      wherein the gamma-ray detector is positioned in the measuring cell,
      wherein the gamma-ray detector is surrounded by a watertight containment,
   iii. a data processing unit comprising a processor configured to provide simulated gamma-ray pulse-height spectra templates for radionuclides and calibration factors,
      wherein the gamma-ray pulse-height spectra templates are corrected for matrix effects;
      and perform an identification and quantification of at least one radionuclide using a spectral fitting of a measured gamma-ray pulse-height spectrum by a weighted combination of the simulated gamma-ray pulse-height spectra templates for radionuclides and the calibration factors,
      wherein the spectral fitting corrects temperature effects and background effects.

11. The device according to claim 10, wherein the at least one measuring cell is a tank or a flow-through measuring cell.

12. The device according to claim 10, wherein the at least one measuring cell is Pb shielded with a thickness in the range of 10 mm to 50 mm.

13. The device according to claim 10, wherein the gamma-ray detector is a cerium or lanthanum halide or a NaI(Tl) scintillator.

14. The method according to claim 1 for the quantification of radionuclide concentrations in hydrometallurgical processing media.

15. The method according to claim 14 for the quantification of uranium and/or radioactive uranium decay product concentrations in uranium mining solutions or in uranium recovery solutions or the quantification of thorium and/or radioactive $^{232}$Th decay products in rare-earth element processing solutions.

16. The method for the quantification of radionuclide concentrations in hydrometallurgical processing media using the device according to claim 10.

17. The method according to claim 16 for the quantification of uranium and/or radioactive uranium decay product concentrations in uranium mining solutions or in uranium recovery solutions or the quantification of thorium and/or radioactive $^{232}$Th decay products in rare-earth element processing solutions.

18. The method according to claim 1, wherein the simulated gamma-ray spectra templates for radionuclides and calibration factors in step c) are obtained by simulation with a Monte Carlo N-Particle code as provided by Los Alamos National Laboratory or GEANT4.

19. The device according to claim 10, wherein the at least one measuring cell is a tank with at least one inlet and outlet or a pipe.

* * * * *